(12) United States Patent
Cyr (10) Patent No.: US 10,184,507 B2
(45) Date of Patent: Jan. 22, 2019

(54) CENTERING BOLT

(71) Applicant: United Technologies Corporation, Farmington, CT (US)

(72) Inventor: Benjamin D. Cyr, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 266 days.

(21) Appl. No.: 15/172,498

(22) Filed: Jun. 3, 2016

(65) Prior Publication Data
US 2017/0350438 A1 Dec. 7, 2017

(51) Int. Cl.
| | |
|---|---|
| *F16B 35/02* | (2006.01) |
| *F16B 39/04* | (2006.01) |
| *F01D 25/28* | (2006.01) |
| *F04D 29/64* | (2006.01) |
| *F16B 33/00* | (2006.01) |
| *F16B 43/00* | (2006.01) |
| *F16B 5/02* | (2006.01) |
| *F02C 7/00* | (2006.01) |
| *F16B 19/02* | (2006.01) |
| *F16B 35/06* | (2006.01) |

(52) U.S. Cl.
CPC .............. *F16B 39/04* (2013.01); *F01D 25/28* (2013.01); *F02C 7/00* (2013.01); *F04D 29/644* (2013.01); *F16B 5/02* (2013.01); *F16B 19/02* (2013.01); *F16B 33/004* (2013.01); *F16B 35/06* (2013.01); *F16B 43/001* (2013.01); *F05D 2220/32* (2013.01); *F05D 2260/31* (2013.01)

(58) Field of Classification Search
USPC ........ 411/383, 209, 214, 216–218, 221, 220, 411/21, 33, 322, 110, 210, 344, 994, 987, 411/991, 993
See application file for complete search history.

(56) References Cited

U.S. PATENT DOCUMENTS

| | | | |
|---|---|---|---|
| 499,444 | A | 6/1893 | Schumann |
| 1,159,698 | A | 11/1915 | Miller |
| 1,162,531 | A * | 11/1915 | Ward ...................... F16B 39/06 |
| | | | 411/321 |
| 2,550,357 | A | 4/1951 | Jansen |
| 2,633,312 | A | 3/1953 | Hagger |
| 3,640,126 | A * | 2/1972 | Te'eni ...................... G01N 3/00 |
| | | | 73/803 |
| 3,668,968 | A | 6/1972 | Modrey |

(Continued)

FOREIGN PATENT DOCUMENTS

CN 102865277 A 1/2013

OTHER PUBLICATIONS

FAA.gov, "Chapter 7. Aircraft Hardware, Control Cables, and Turnbuckles", AC43.13-1B, available from: <http://www.faa.gov/documentLibrary/media/Advisory_Circular/Chapter_07.pdf>, Sep. 8, 1998.

(Continued)

*Primary Examiner* — Gary W Estremsky
(74) *Attorney, Agent, or Firm* — O'Shea Getz P.C.

(57) ABSTRACT

Aspects of the disclosure are directed to a bolt comprising: a body having a head, a circumferential sidewall, a central bore extending at least a portion of a length of the bolt, and a plurality of slots extending through the sidewall from the bore, a plurality of positioning arms at least partially located within an interior of the bolt, and a screw seated within the head, where a position of the screw within the head controls an extent to which the plurality of positioning arms are extended through the sidewall.

18 Claims, 11 Drawing Sheets

(56) References Cited

U.S. PATENT DOCUMENTS

| | | | | |
|---|---|---|---|---|
| 3,750,259 A * | 8/1973 | Timmons | ............... | B23G 9/009 |
| | | | | 29/240 |
| 4,355,917 A * | 10/1982 | Bunger | .................. | F02N 15/06 |
| | | | | 403/24 |
| 4,636,121 A * | 1/1987 | Miller | .................... | F16B 39/04 |
| | | | | 411/140 |
| 4,715,757 A * | 12/1987 | Edminster | ............... | F16B 13/08 |
| | | | | 102/293 |
| 4,948,369 A | 8/1990 | Braccio | | |
| 5,702,215 A * | 12/1997 | Li | ........................ | F16B 13/0866 |
| | | | | 411/21 |
| 5,816,760 A * | 10/1998 | Mattner | ............... | F16B 13/004 |
| | | | | 411/30 |
| 5,816,761 A * | 10/1998 | Cassatt | ............... | F16B 19/1063 |
| | | | | 411/34 |
| 5,851,129 A | 12/1998 | Matsunaga | | |
| 6,170,141 B1 | 1/2001 | Rossway | | |
| 6,298,536 B1 | 10/2001 | Rossway | | |
| 7,532,735 B2 | 5/2009 | Whitehouse | | |
| 8,273,974 B1 | 9/2012 | Gonzalez | | |
| 8,486,120 B2 * | 7/2013 | Shimko | ................ | A61C 8/0074 |
| | | | | 411/55 |
| 9,028,184 B2 * | 5/2015 | Bone | .................. | F16B 13/0833 |
| | | | | 411/21 |
| 9,308,035 B2 * | 4/2016 | Biedermann | ...... | A61B 17/7258 |
| 2004/0181222 A1 * | 9/2004 | Culbert | ............... | A61B 17/685 |
| | | | | 606/60 |

OTHER PUBLICATIONS

EP search report for EP17174451.9 dated Nov. 7, 2017.

\* cited by examiner

CENTERING BOLT

BACKGROUND

Gas turbine engines, such as those which power aircraft and industrial equipment, employ a compressor to compress air that is drawn into the engine and a turbine to capture energy associated with the combustion of a fuel-air mixture. Engineers of such engines have to constantly work with and design for large tolerance stacks (e.g., collections of various tolerances) and circumstances that impact data integrity, installation, and performance quality and repeatability.

Various sections of the engine may be connected to one another via one or more attachment mechanisms, such as one or more bolts. A bolt impacts the tolerance stack in terms of, e.g., a clearance hole around the bolt. For example, variability in the bolt or associated clearance hole may result in a misalignment of a flowline, impacting flow paths. Variability in an orientation of instrumentation may render data provided by the instrumentation unreliable or even unusable.

Figure 2A:
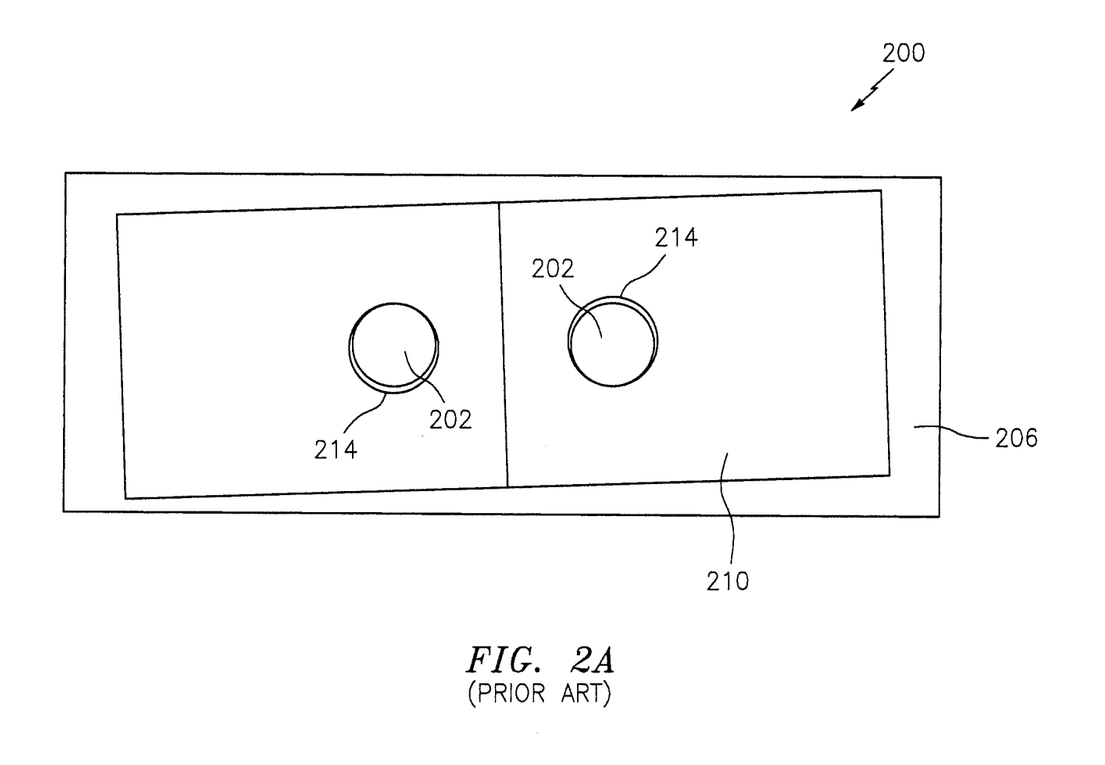
FIG. 2A illustrates a prior art system incorporating bolts coupled to a boss via a flange.

FIG. 2A illustrates an example of a system 200 in accordance with the above and the prior art. In particular, the system 200 includes two bolts 202 coupled to a mounting boss 206 via a flange 210. The bolts 202 are seated within respective clearance holes 214. As shown in FIG. 2A, the bolts 202 are not necessarily centered within the clearance holes 214. Furthermore, there is a rotational misalignment between, e.g., the boss 206 and the flange 210

What is needed is an improved technique for centering a bolt within a clearance hole. Furthermore, what is needed is an ability to obtain more accurate installation per a print/specification, allowing for repeatability throughout multiple installations of the bolted object.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a bolt comprising: a body having a head, a circumferential sidewall, a central bore extending at least a portion of a length of the bolt, and a plurality of slots extending through the sidewall from the bore, a plurality of positioning arms at least partially located within an interior of the bolt, and a screw seated within the head, where a position of the screw within the head controls an extent to which the plurality of the positioning arms are extended through the sidewall. In some embodiments, the plurality of positioning arms includes at least three positioning arms equidistantly located about the periphery of the sidewall. In some embodiments, the positioning arms are at substantially the same axial location along an axis of the bolt. In some embodiments, a first of the positioning arms is offset from a second of the positioning arms in terms of a location along an axis of the bolt. In some embodiments, each of the positioning arms includes a respective end configured to couple to an inner diameter of a clearance hole when the positioning arms are extended. In some embodiments, at least one of the positioning arms includes a landing that contacts the screw. In some embodiments, at least one of the positioning arms includes a hook that is configured to retain at least a portion of the at least one positioning arm within the interior of the bolt. In some embodiments, the bolt further comprises a spacer located between the screw and the positioning arms, and a spring that biases at least one of the positioning arms towards the spacer.

Aspects of the disclosure are directed to a system comprising: a flange, a mounting boss, at least one bolt coupled to the mounting boss via the flange, where the at least one bolt includes: a body having a head, a circumferential sidewall, a central bore extending at least a portion of a length of the bolt, and a plurality of slots extending through the sidewall from the bore, a plurality of positioning arms at least partially located within an interior of the bolt, and a screw seated within the head, where a position of the screw within the head controls an extent to which the positioning arms are extended through the sidewall. In some embodiments, the system is incorporated as part of an aircraft engine. In some embodiments, the head includes first threads that mate with second threads of the screw. In some embodiments, the system further comprises a second flange. In some embodiments, the positioning arms are at substantially the same axial location along an axis of the bolt, and when the positioning arms are extended each of the positioning arms contacts an interface between the flange and the second flange. In some embodiments, a first of the positioning arms is offset from a second of the positioning arms in terms of a location along an axis of the bolt. In some embodiments, the first of the positioning arms positions the flange when the first of the positioning arms is extended. In some embodiments, the second of the positioning arms positions the second flange when the second of the positioning arms is extended. In some embodiments, the positioning arms are configured to be removed from the bolt. In some embodiments, the system further comprises an o-ring seal or a sealant applied to the head. In some embodiments, the system is configured to align a position of a test apparatus within a threshold.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to a bolt that has a screw. The bolts may be installed through a flange and into a threaded boss. The screw may be located/seated in a head of the bolt. The bolt may include one or more positioning arms that may project from an axis of the bolt when the screw is tightened to prevent the bolted object from being able to 'float' around the bolt within a span of a clearance hole. For example, the positioning arms may contact an inner diameter of the clearance hole, causing the bolt to be centered within the clearance hole.

Aspects of the disclosure may be applied in one or more environments, such as for example: bolted pipe/flowline sections (be it fuel, oil, or air lines), instrumentation, test equipment, product hardware, etc. Aspects of the disclosure may be used to enhance the alignment/orientation of one or more probes in terms of the accuracy of such alignment/orientation relative to one or more specifications.

Figure 1:
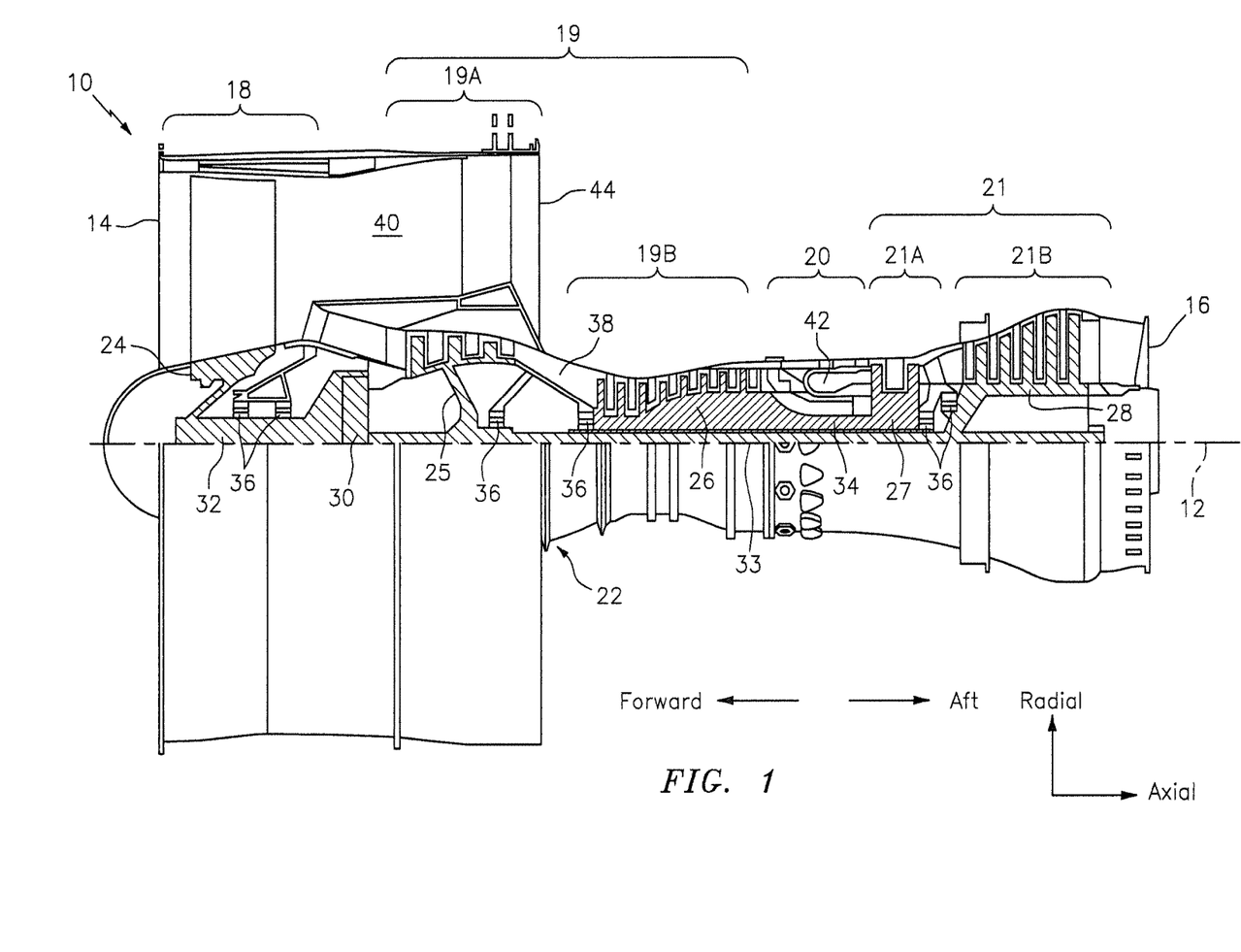
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HIT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2B:
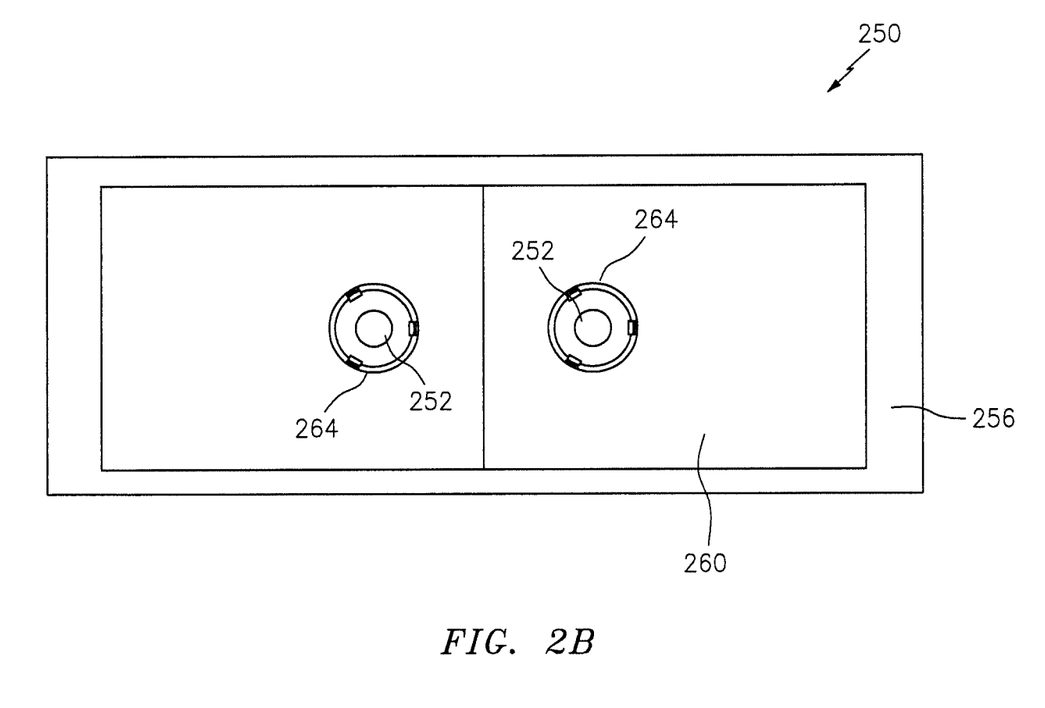
FIG. 2B illustrates a system incorporating bolts coupled to a boss via a flange in accordance with this disclosure.

As described above, aspects of the disclosure may be used to obtain a centering of a bolt within a clearance hole and an alignment of a flange relative to a boss. FIG. 2B illustrates a system 250 where bolts 252 are substantially centered within respective clearance holes 264 and a flange 260 is substantially aligned with a mounting boss 256. The arrangement obtained in FIG. 2B may be contrasted with the arrangement shown in FIG. 2A (where in FIG. 2A the bolts are not centered with respect to the clearance holes and the flange is rotated relative to the boss).

Figure 3:
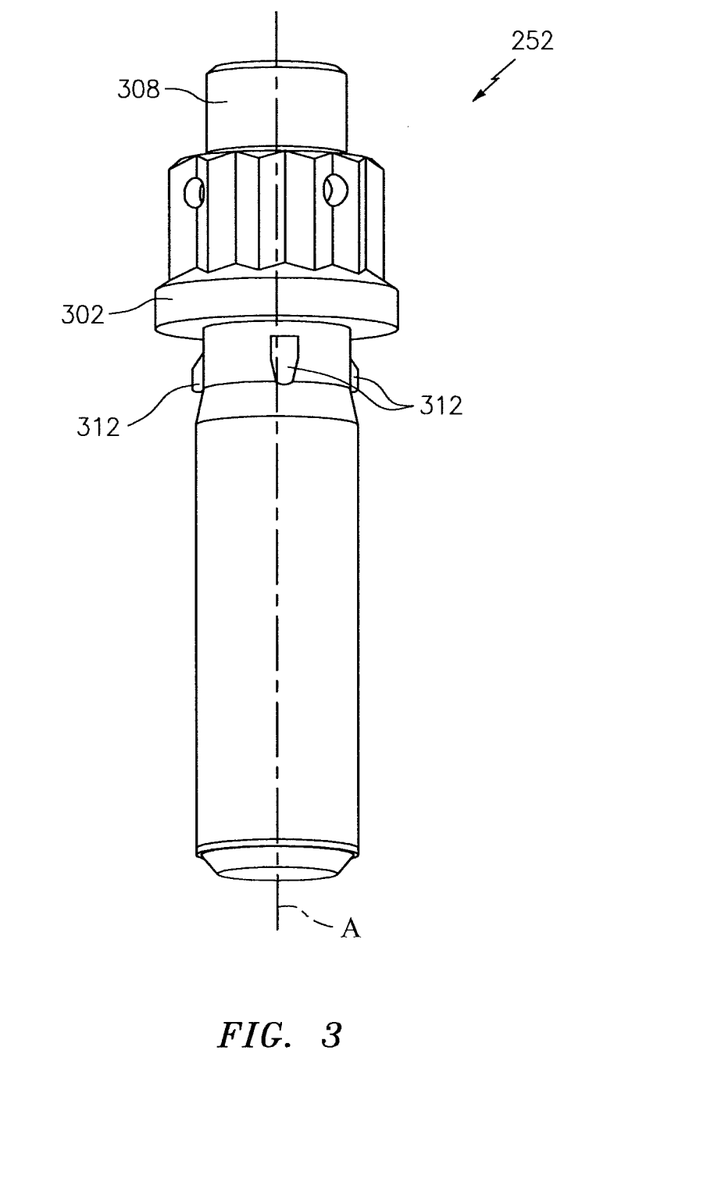
FIG. 3 illustrates an exterior view of a bolt in accordance with aspects of this disclosure.
Figure 4A:
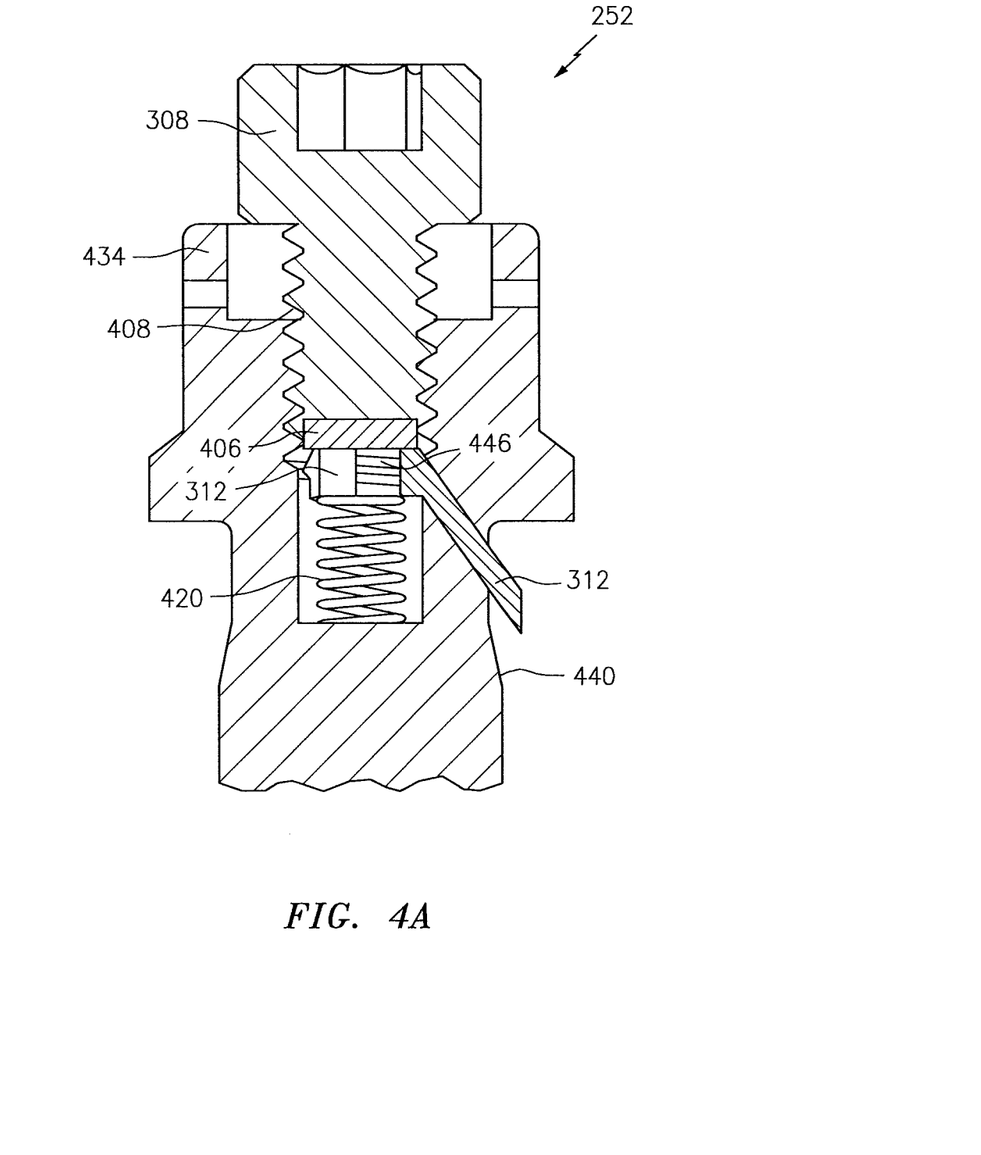
FIG. 4A illustrates a cross-section of a bolt with positioning arms in an extended state.
Figure 4B:
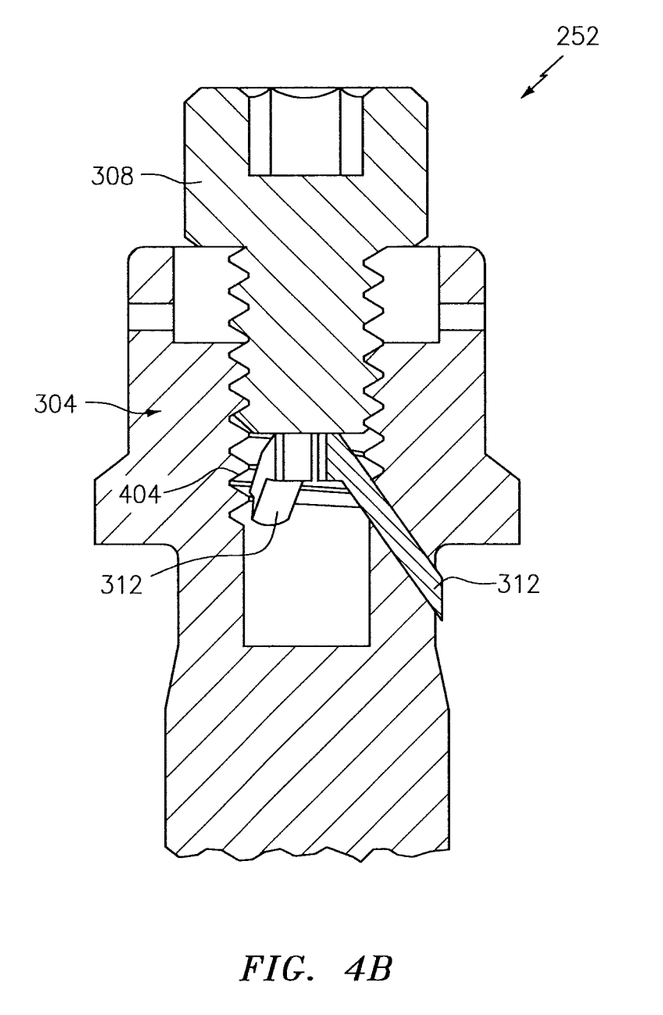
FIG. 4B illustrates a cross-section of a bolt with positioning arms in a retracted state.

FIG. 3 illustrates one of the bolts 252. In FIG. 3, the bolt 252 is shown as including a body 302. At least a portion of the body 302 may be configured to seat a screw 308. Referring to FIGS. 3 and 4A-4B, the screw 308 may include threads 408 that may mate with one or more threads 404 formed in the body 302.

Referring to FIG. 3, the bolt 252 may include one or more positioning arms 312. Illustratively, three positioning arms 312 are shown as being located around the perimeter (e.g., circumference) of the bolt 252, equidistantly spaced from one another (e.g., 120 degrees of separation around the perimeter of the bolt 252). While the positioning arms 312 are shown as being located at approximately the same axial location (relative to the span/axis A of the bolt 252) in FIG. 3, a first of the positioning arms 312 may be axially offset from a second of the positioning arms 312 in some embodiments.

In some embodiments, a lubricant may be applied to the positioning arms 312 to facilitate their movement (e.g., extension or retraction as described further below). The positioning arms 312 may be made of the same material as the rest of the bolt 252 in order to promote the same thermal behavior (e.g., thermal growth).

FIG. 4A illustrates a cross-sectional view of the bolt 252 of FIG. 3. As shown, the bolt 252 (e.g., the body 302 of FIG. 3) may include a spacer/washer 406 that may separate/isolate the screw 308 from the positioning arms 312. For example, the spacer 406 may isolate/prevent the rotational force/moment of the screw 308 from being imparted on the positioning arms 312, such that the positioning arms 312 are simply impacted by the vertical force imparted by the screw 308. In some embodiments, a positioning arm 312 may include, or be associated with, a spring 420. The spring 420 may bias the positioning arm 312 towards the spacer 406.

Whereas FIG. 4A illustrates the positioning arms 312 in an extended state (e.g., contacting an inner diameter of the clearance holes 264 of FIG. 2B), FIG. 4B illustrates the positioning arms 312 in a retracted state (e.g., not secured to the clearance holes 264); in FIG. 4B the optional spring 420 and spacer 406 are not shown/included for ease of illustration. In FIG. 4A, the screw 308 may be fully screwed into the body 302, whereas in FIG. 4B the screw 308 may be partially withdrawn within the body 302. More generally, an axial position of the screw 308 within the body 302 may control an extent to which the positioning arms 312 are extended (or analogously, retracted).

Figure 6:
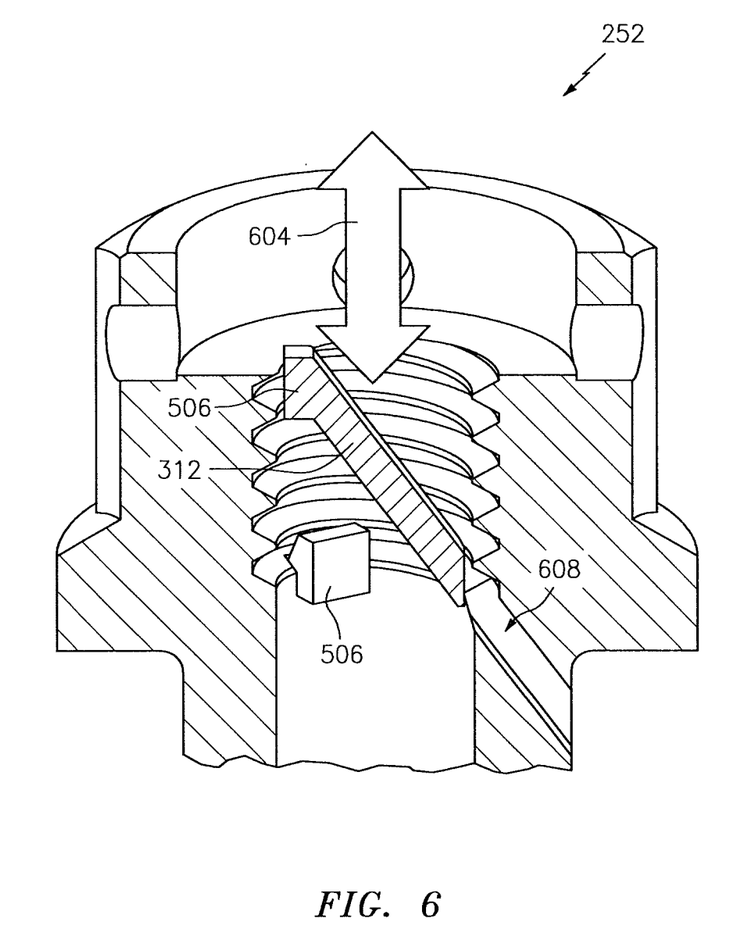
FIG. 6 illustrates a configuration of a bolt that provides for insertion/removal of a positioning arm into/from a slot of the bolt.

Referring to FIGS. 4A and 6, the bolt 252 (e.g., the body 302) may include a head 434, a circumferential sidewall 440, a central bore 446 extending at least a portion of a(n axial) length of the bolt 252, and a plurality of slots 608 extending through the sidewall 440 from the bore 446.

Figure 5:
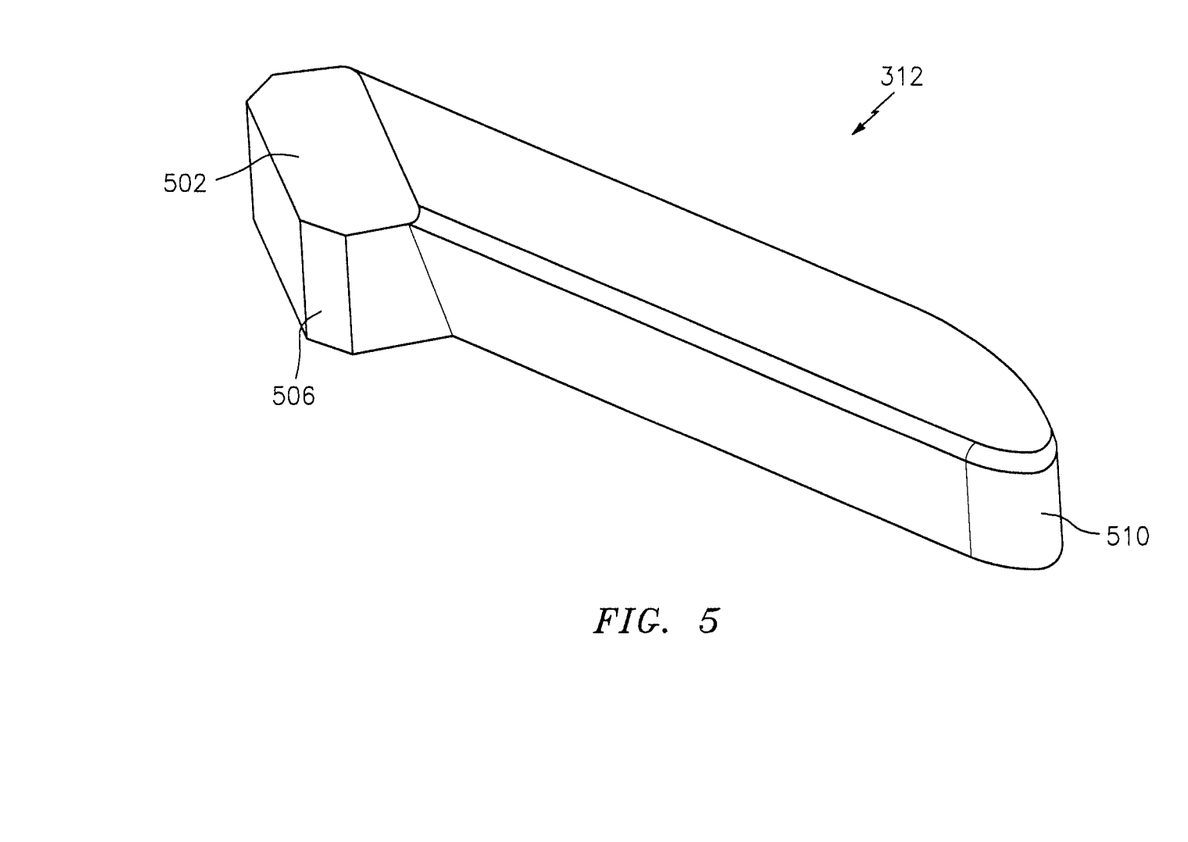
FIG. 5 illustrates a positioning arm in accordance with aspects of this disclosure.

FIG. 5 illustrates the positioning arm 312 in greater detail. The particular shape/geometry of the positioning arm 312 shown in FIG. 5 is illustrative. As one skilled in the art would appreciate, other shapes/geometries, relative dimensions, etc. may be used based on the application environment.

The positioning arm 312 may include a landing 502, a hook 506, and an end 510. The landing 502 may be configured to contact the screw 308. The hook 506 may ensure that the positional arm 312 does not fall out of the bolt 252 (and into, e.g., the engine 10 of FIG. 1) as the size/dimension of the hook 506 may be larger than a slot that the positioning arm is seated in (e.g., slot 608 of FIG. 6—described further below). The end 510, which may contact the inner diameter of the clearance hole 264 of FIG. 2B, may include a curved profile (e.g., a radius), a pointed profile, a square/rectangular profile, etc. The profile of the end 510 may be selected to ensure that a sufficient frictional force (e.g., a force in an amount greater than a threshold) is obtained to hold the bolt 252 securely in place.

FIG. 6 illustrates in greater detail a positioning arm 312 within a bolt 252. In particular, as reflected via the arrow 604, the positioning arms 312 may be installed and/or removed, one at a time, through the center of the bolt 252. A positioning arm 312 may be sized such that the positioning arm 312 can fit in the center hole of the bolt 252 and slide into a slot 608 formed in (a structure of) the bolt 252. As described above, a hook 506 of the positioning arm 312 may prevent the positioning arm 312 from falling out of the bolt 252 (through the slot 608); the dimensions of one or more of the positioning arm 312 (inclusive of the hook 506), the slot 608, and the clearance hole 264 may be selected to accommodate retention of the positioning arm 312 within the bolt 252. To the extent that leakage is a concern, a sealant and/or an o-ring seal (not shown) may be applied to the head 304.

Figure 7A:
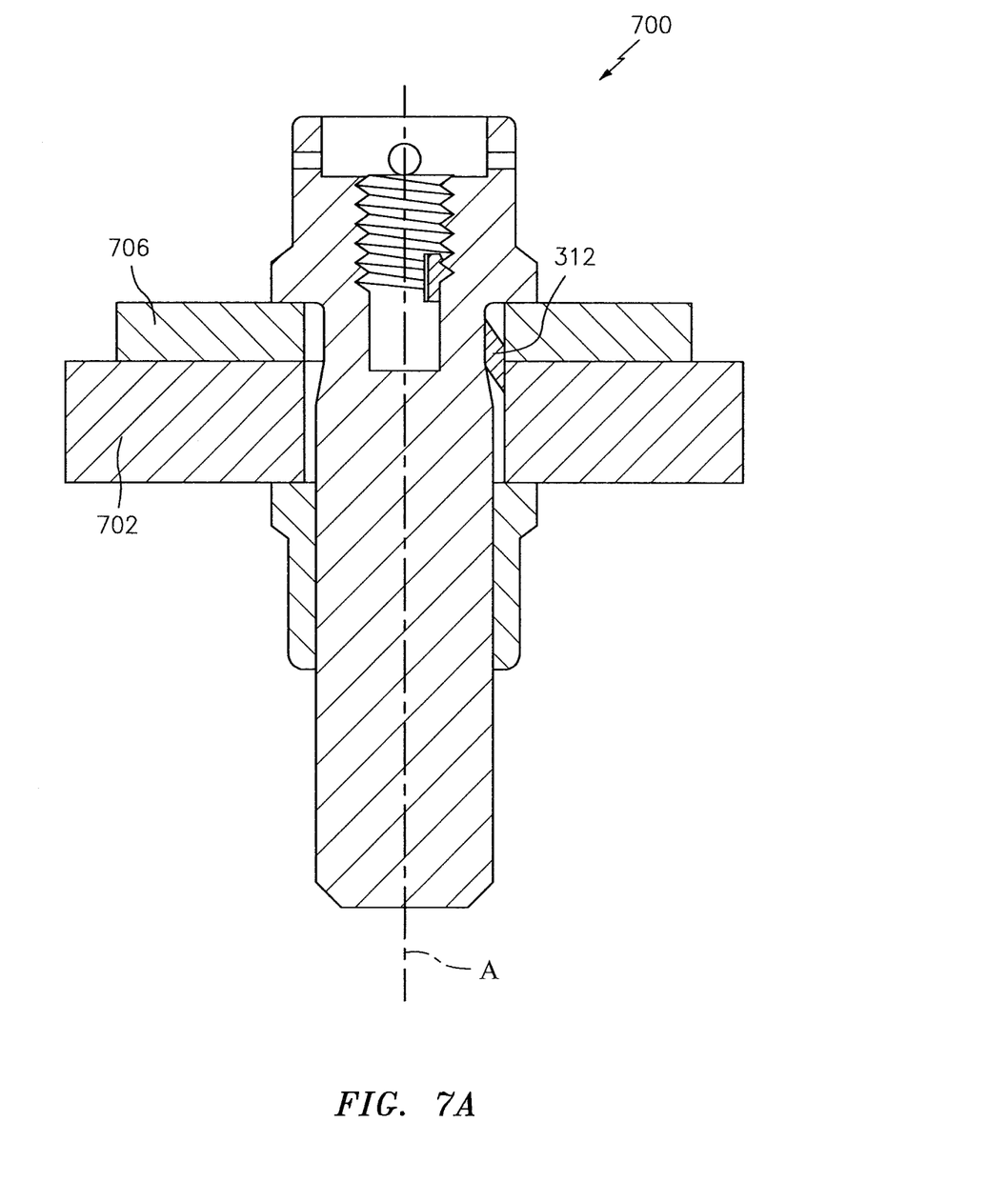
FIGS. 7A-7B illustrate one or more positioning arms of a bolt in relation to a plurality of flanges.

FIG. 7A illustrates a system 700 where a bolt 252 interfaces with two or more flanges, such as for example a flange 702 and a flange 706. The system 700 may be particularly applicable in environments where a nut is used. In FIG. 7A, a positioning arm 312 is shown as contacting the flange 702 and the flange 706 at an interface between the flange 702 and the flange 706 when the positioning arm is in its extended position (e.g., similar to what is shown in FIG. 4A).

Figure 7B:
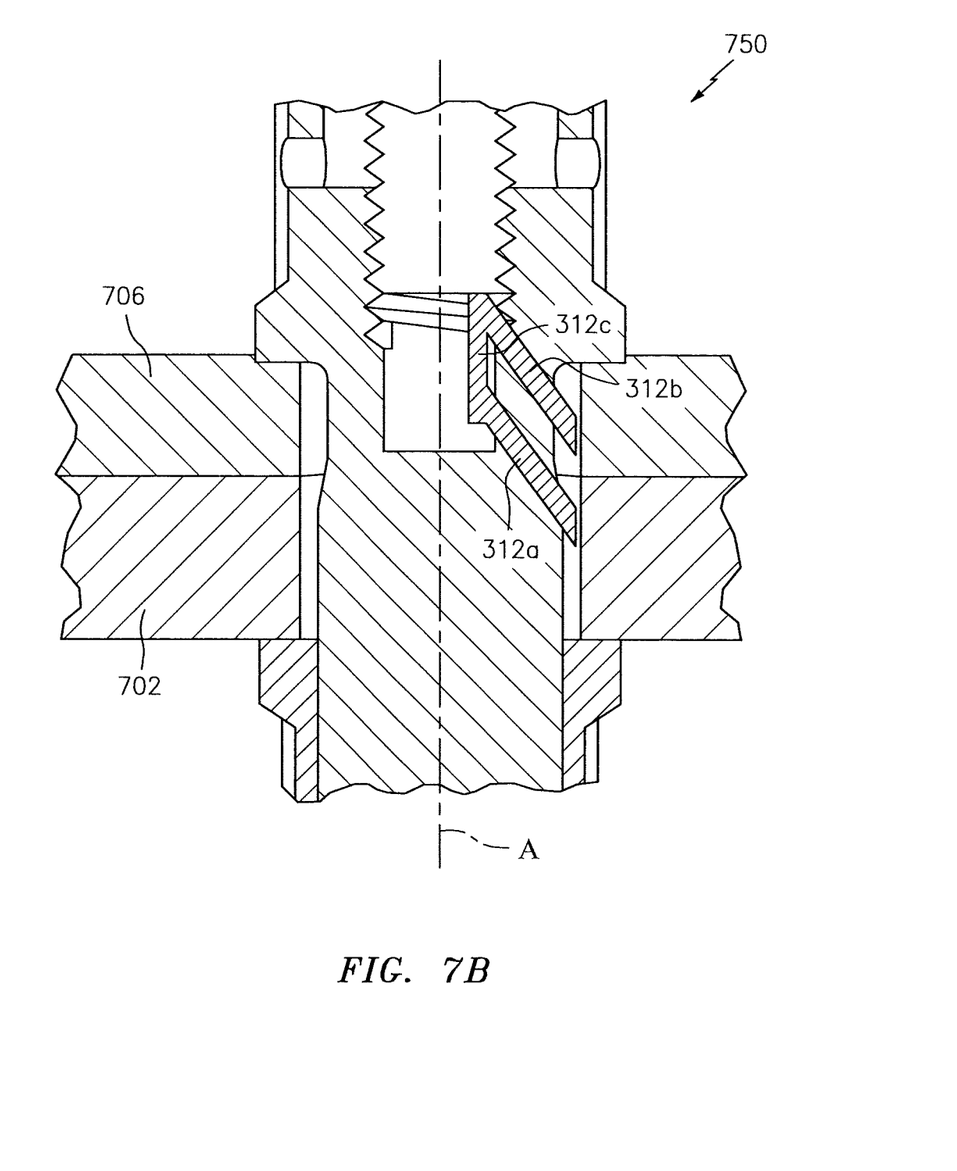

Alternatively, and as described above, the positioning arms 312 may assume different axial positions along the axis A. For example, and referring to the system 750 of FIG. 7B, a first positioning arm 312a may be positioned in relation to a first of the flanges (e.g., the flange 702) and a second positioning arm 312b may be positioned in relation to a second of the flanges (e.g., the flange 706). As shown in FIG. 7B, the arms 312a and 312b may correspond to prongs of a forked arrangement, where the arms 312a and 312b may emanate from a positioning arm core 312c.

Figure 8:
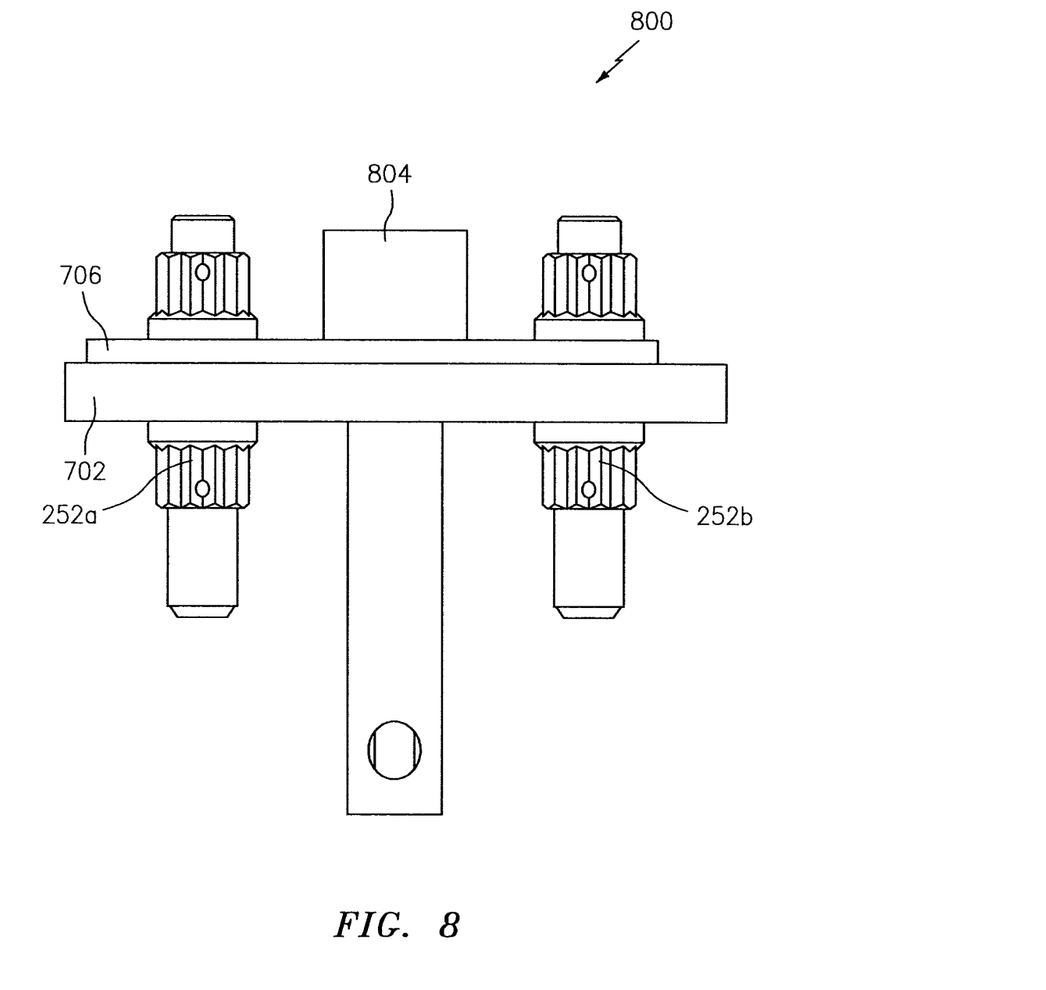
FIG. 8 illustrates a system incorporating bolts, flanges, and a test apparatus.

Referring to FIG. 8, a system 800 is shown. The system 800 may include two bolts, denoted as 252a and 252b. The bolts 252a and 252b may cooperate with the flanges 702 and 706 to seat/capture a test apparatus 804. The test apparatus 804 may include a probe. By virtue of the bolts 252a and 252b and the flanges 702 and 706, the actual position/alignment of the test apparatus 804 (relative to a reference position/alignment) may be repeatable or more consistent over multiple instances of the system 800, such that the actual position/alignment may be within one or more thresholds.

In some embodiments, after the bolts are torqued tight enough to hold the associated hardware, the screw may be loosened and the final torqueing of the bolts may be performed. This may have a tendency to center the mounting hardware to the bolt holes and maintain accuracy and repeatability.

In embodiments where two or more of the bolts (e.g., bolts 252) of this disclosure are used to position and hold an object in place, the bolts may be installed. Thereafter, one at a time, the bolts of this disclosure may be replaced with conventional bolts. One may want to do this if, for example, one has a large number/supply of conventional bolts or if the conventional bolts are cheaper to manufacture.

Technical effects and benefits of this disclosure include a bolt that has enhanced accuracy in terms of correspondence to one or more prints or specifications. The bolt includes centering features (e.g., positioning arms) that enable the bolt to be aligned the same way across multiple units. This consistency, in turn, maximizes engine efficiency and performance, enhances accuracy in testing, provides for accuracy in data/measurement, etc. Various environments may be accommodated by adjusting the position/location, angle, and/or size of the positioning arms or associated bolt slots.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A bolt comprising:
   a body having a head, a circumferential sidewall, a central bore extending at least a portion of a length of the bolt, and a plurality of slots extending through the sidewall from the bore;
   a plurality of positioning arms at least partially located within an interior of the bolt;
   a screw seated within the head;
   a spacer located between the screw and the positioning arms; and
   a spring that biases at least one of the positioning arms towards the spacer,
   wherein a position of the screw within the head controls an extent to which the plurality of positioning arms are extended through the sidewall.

2. The bolt of claim 1, wherein the plurality of positioning arms includes at least three positioning arms equidistantly located about the periphery of the sidewall.

3. The bolt of claim 1, wherein the positioning arms are at substantially the same axial location along an axis of the bolt.

4. The bolt of claim 1, wherein a first of the positioning arms is offset from a second of the positioning arms in terms of a location along an axis of the bolt.

5. The bolt of claim 1, where each of the positioning arms includes a respective end configured to couple to an inner diameter of a clearance hole when the positioning arms are extended.

6. The bolt of claim 1, where at least one of the positioning arms includes a landing that contacts the screw.

7. The bolt of claim 1, where at least one of the positioning arms includes a hook that is configured to retain at least a portion of the at least one positioning arm within the interior of the bolt.

8. A system comprising:
   a flange;
   a mounting boss;
   at least one bolt coupled to the mounting boss via the flange,
   wherein the at least one bolt includes:
      a body having a head, a circumferential sidewall, a central bore extending at least a portion of a length of the bolt, and a plurality of slots extending through the sidewall from the bore;
      a plurality of positioning arms at least partially located within an interior of the bolt; and
      a screw seated within the head;
      a spacer located between the screw and the positioning arms; and
      a spring that biases at least one of the positioning arms towards the spacer,
      wherein a position of the screw within the head controls an extent to which the positioning arms are extended through the sidewall.

9. The system of claim 8, wherein the system is incorporated as part of an aircraft engine.

10. The system of claim 8, wherein the head includes first threads that mate with second threads of the screw.

11. The system of claim 8, further comprising:
    a second flange.

12. The system of claim 11, wherein the positioning arms are at substantially the same axial location along an axis of the bolt, and wherein when the positioning arms are extended each of the positioning arms contacts an interface between the flange and the second flange.

13. The system of claim 11, wherein a first of the positioning arms is offset from a second of the positioning arms in terms of a location along an axis of the bolt.

14. The system of claim 13, wherein the first of the positioning arms positions the flange when the first of the positioning arms is extended.

15. The system of claim 14, wherein the second of the positioning arms positions the second flange when the second of the positioning arms is extended.

16. The system of claim 8, wherein the positioning arms are configured to be removed from the bolt.

17. The system of claim 8, further comprising:
    an o-ring seal or a sealant applied to the head.

18. The system of claim 8, wherein the system is configured to align a position of a test apparatus within a threshold.

\* \* \* \* \*

UNITED STATES PATENT AND TRADEMARK OFFICE
CERTIFICATE OF CORRECTION

PATENT NO. : 10,184,507 B2
APPLICATION NO. : 15/172498
DATED : January 22, 2019
INVENTOR(S) : Benjamin Cyr Page 1 of 1

It is certified that error appears in the above-identified patent and that said Letters Patent is hereby corrected as shown below:

In the Specification

Column 3, Line 59, please delete "HIT" and insert --HPT--.

Signed and Sealed this
Twenty-sixth Day of February, 2019

Andrei Iancu
*Director of the United States Patent and Trademark Office*